United States Patent
Yang et al.

(10) Patent No.: US 12,086,400 B2
(45) Date of Patent: Sep. 10, 2024

(54) METHOD, ELECTRONIC DEVICE, AND STORAGE MEDIUM FOR DISPLAYING SHORTCUT IDENTIFICATION CARD AND APPLICATION IDENTIFICATION CARD

(71) Applicant: Lenovo (Beijing) Limited, Beijing (CN)

(72) Inventors: Mingxin Yang, Beijing (CN); Xiaomeng Zhou, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/677,987

(22) Filed: Feb. 22, 2022

(65) Prior Publication Data

US 2023/0089457 A1    Mar. 23, 2023

(30) Foreign Application Priority Data

Sep. 22, 2021    (CN) .......................... 202111108031.5

(51) Int. Cl.
| | |
|---|---|
| *G06F 3/0482* | (2013.01) |
| *G06F 1/16* | (2006.01) |
| *G06F 3/04847* | (2022.01) |
| *G06F 3/04883* | (2022.01) |
| *G06F 9/48* | (2006.01) |

(52) U.S. Cl.
CPC ........ *G06F 3/04847* (2013.01); *G06F 1/1677* (2013.01); *G06F 3/0482* (2013.01); *G06F 3/04883* (2013.01); *G06F 9/4881* (2013.01); *G06F 2200/1637* (2013.01)

(58) Field of Classification Search
CPC .. G06F 3/04847; G06F 1/1677; G06F 3/0482; G06F 3/04883; G06F 9/4881; G06F 2200/1637; G06F 1/1652; G06F 1/1694; G06F 2200/1614; G06F 3/0483; G06F 3/0481; G06F 9/451
See application file for complete search history.

(56) References Cited

U.S. PATENT DOCUMENTS

| | | | | |
|---|---|---|---|---|
| 9,152,179 | B2* | 10/2015 | Sirpal ................. | H04M 1/0206 |
| 10,250,645 | B1* | 4/2019 | Smith .................... | G06F 21/45 |
| 10,261,672 | B1* | 4/2019 | Dolbakian .......... | G06F 3/04883 |
| 2004/0244052 | A1* | 12/2004 | Kim ................. | H04N 21/26283 |
| | | | | 725/135 |
| 2009/0199122 | A1* | 8/2009 | Deutsch .................. | G06F 9/445 |
| | | | | 715/771 |
| 2012/0216146 | A1* | 8/2012 | Korkonen ........... | G06F 3/04817 |
| | | | | 715/835 |

(Continued)

*Primary Examiner* — Kuang F Chen
(74) *Attorney, Agent, or Firm* — ANOVA LAW GROUP, PLLC

(57) ABSTRACT

Information processing method and apparatus, electronic device, and storage medium are provided. The method includes obtaining a trigger operation; responding to the triggering operation and calling the multitasking manager; and displaying the multitasking manager. The multitasking manager includes at least one identification card obtained based on a target strategy. Each identification card includes at least one operation button. An operation button of the at least one operation button generates a control instruction for an application program corresponding to the identification card including the operation button to respond.

14 Claims, 12 Drawing Sheets

(56) References Cited

U.S. PATENT DOCUMENTS

| | | | |
|---|---|---|---|
| 2013/0208000 A1* | 8/2013 | Uysal | G06F 3/04847 |
| | | | 345/660 |
| 2015/0052464 A1* | 2/2015 | Chen | G06F 3/167 |
| | | | 715/765 |
| 2018/0335921 A1* | 11/2018 | Karunamuni | G06F 3/0485 |
| 2019/0346999 A1* | 11/2019 | Yuan | G06Q 10/1093 |
| 2020/0202600 A1* | 6/2020 | Chang | G09G 5/14 |
| 2020/0293152 A1* | 9/2020 | Saraya | G06F 3/0481 |
| 2020/0326839 A1* | 10/2020 | Walkin | G06F 3/0482 |
| 2021/0240332 A1* | 8/2021 | Walkin | G06F 3/0485 |
| 2022/0188131 A1* | 6/2022 | Song | G06F 3/0483 |
| 2022/0206677 A1* | 6/2022 | Zadina | G06F 3/04847 |
| 2022/0291794 A1* | 9/2022 | Bian | G06F 3/0481 |

* cited by examiner (A)

(B)

METHOD, ELECTRONIC DEVICE, AND STORAGE MEDIUM FOR DISPLAYING SHORTCUT IDENTIFICATION CARD AND APPLICATION IDENTIFICATION CARD

CROSS-REFERENCE TO RELATED APPLICATION

This application claims priority of Chinese Patent Application No. 202111108031.5, filed on Sep. 22, 2021, the entire content of which is hereby incorporated by reference.

FIELD OF THE DISCLOSURE

The present disclosure generally relates to the field of computer technology and, more particularly, relates to an information processing method and apparatus, an electronic device, and a storage medium.

BACKGROUND

In a process of using an electronic device, a user usually opens a plurality of tasks. Often, the user needs to switch between different tasks frequently, resulting in inconvenient user operations and a poor user interaction experience.

BRIEF SUMMARY OF THE DISCLOSURE

One aspect of the present disclosure provides an information processing method. The method includes obtaining a trigger operation; responding to the triggering operation and calling the multitasking manager; and displaying the multitasking manager. The multitasking manager includes at least one identification card obtained based on a target strategy. Each identification card includes at least one operation button. An operation button of the at least one operation button generates a control instruction for an application program corresponding to the identification card including the operation button to respond.

Another aspect of the present disclosure provides a display device. The display device includes a memory containing at least one set of instructions; and a processor coupled to the memory and, when an instruction set of the at least one set of instructions being executed, configured to: obtain a trigger operation; respond to the triggering operation and call the multitasking manager; and display the multitasking manager. The multitasking manager includes at least one identification card obtained based on a target strategy. Each identification card includes at least one operation button. An operation button of the at least one operation button generates a control instruction for an application program corresponding to the identification card including the operation button to respond.

Another aspect of the present disclosure provides a storage medium for storing a computer program implementing an information processing method, executing the computer program by a processor to realize the method. The method includes obtaining a trigger operation; responding to the triggering operation and calling the multitasking manager; and displaying the multitasking manager. The multitasking manager includes at least one identification card obtained based on a target strategy. Each identification card includes at least one operation button. An operation button of the at least one operation button generates a control instruction for an application program corresponding to the identification card including the operation button to respond.

Other aspects of the present disclosure can be understood by a person skilled in the art in light of the description, the claims, and the drawings of the present disclosure.

BRIEF DESCRIPTION OF THE DRAWINGS

To illustrate technical solutions in embodiments of the present disclosure more clearly, the following briefly introduces accompanying drawings that need to be used in a description of the embodiments. Obviously, the accompanying drawings in the following description are only some embodiments of the present disclosure. For a person skilled in the art, other drawings can also be obtained from the accompanying drawings without creative efforts.

DETAILED DESCRIPTION

The technical solutions in the embodiments of the present disclosure will be clearly and completely described below with reference to the accompanying drawings in various embodiments of the present disclosure. Obviously, the described embodiments are only some of the embodiments of the present disclosure, but not all the embodiments. Based on the embodiments in the present disclosure, all other embodiments obtained by a person skilled in the art without creative efforts shall fall within the protection scope of the present disclosure.

To make the above objects, features, and advantages of the present disclosure more obvious and easier to understand, the present disclosure is further described in detail below with reference to the accompanying drawings and specific embodiments.

Figure 1:
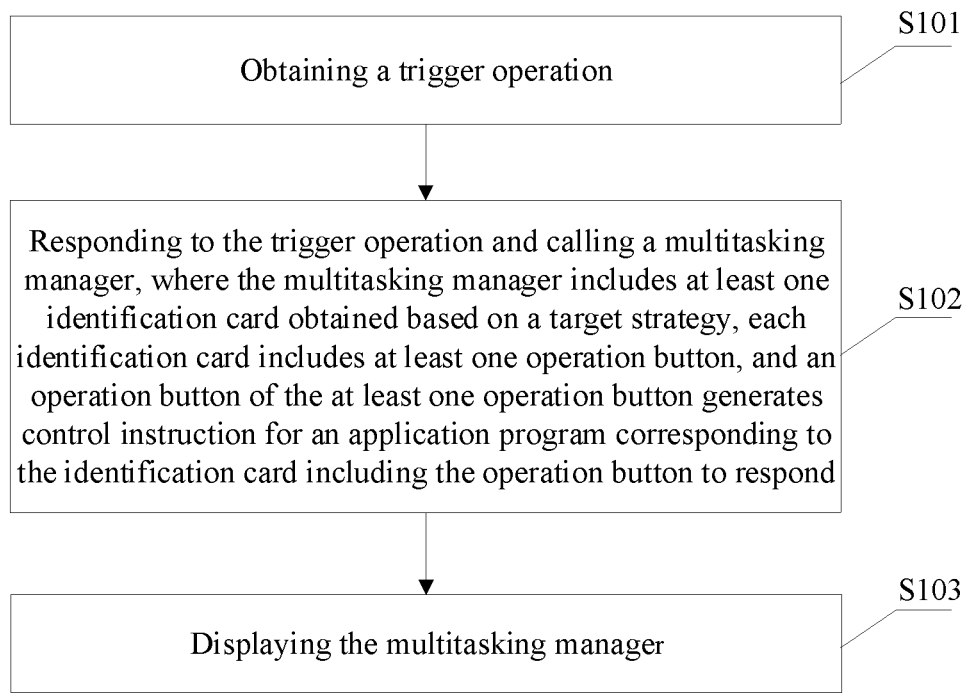
FIG. 1 illustrates a flowchart of an information processing method provided by various embodiments of the present disclosure.

FIG. 1 illustrates a flowchart of an information processing method provided by various embodiments of the present disclosure. The method can be applied to an electronic device. The present disclosure does not limit a product type of the electronic device, any suitable type of devices may be used to implement the disclosed methods. As shown in FIG. 1, the method can include but is not limited to following exemplarily steps.

In S101: obtaining a trigger operation.

The trigger operation can be configured to trigger an electronic device to call a multitasking manager. The multitasking manager can be understood as a program capable of at least managing tasks of the electronic device. The tasks of the electronic device may include but are not limited to application programs and a performance of the electronic device.

In the embodiment, the trigger operation can be inputted by inputting a specific screen swipe gesture such as a gesture of sliding up from a bottom of a display screen of the electronic device. Alternatively, the trigger operation can be inputted by pressing a key or key combination on the electronic device to trigger. Alternatively, the trigger operation can be inputted by clicking on a specific icon on the display screen of the electronic device.

In S102: responding to the trigger operation and calling a multitasking manager, where the multitasking manager includes at least one identification card obtained based on a target strategy, each identification card includes at least one operation button, and an operation button of the at least one operation button generates a control instruction for an application program corresponding to the identification card including the operation button to respond.

The target strategy can be configured to obtain an identification card that includes at least one operation button.

An identification card may correspond to at least one application program, and the application programs corresponding to each identification card may be different.

An operation button included in the identification card may support the trigger operation. Alternatively, both the identification card and the operation button included in the identification card may support the trigger operation.

If the trigger operation on the operation button included in the identification card is obtained, in response to the trigger operation on the operation button included in the identification card, the operation button can generate a control instruction for an application program corresponding to the identification card including the operation button to respond, so that the application program can respond accordingly based on the control instruction.

If a trigger action for the identification card including the operation buttons is obtained, the electronic device can be triggered to make a response related to the application program corresponding to the identification card including program corresponding to the identification card including the operation button. Specifically, the electronic device can be triggered to start the application program corresponding to the identification card including the operation button.

In S103: displaying the multitasking manager.

A display manner of the multitasking manager is not limited in the embodiment. Specifically, it is possible but not limited to display only the multitasking manager in a first specific display output area of the electronic device when the electronic device is in a portrait state. Alternatively, when the electronic device is in a landscape state, the multitasking manager is displayed in a second specific display output area of the electronic device.

Based on the displaying of the multitasking manager, by triggering the identification card included in the multitasking manager, the electronic device can be triggered to make a response related to the application program corresponding to the identification card. Alternatively, by triggering the operation button included in the identification card included in the multitasking manager, the operation button generates a control instruction for the application program corresponding to the identification card including the operation button to respond, so that the application program can respond accordingly based on the control instruction.

In the embodiment, by obtaining a trigger operation, responding to the trigger operation, calling and displaying a multitasking manager including at least one identification card, and each identification card including at least one operational control, the operation button can be triggered by the multitasking manager, so that an application program corresponding to the identification card including the operation buttons responds without entering the application program and inputting a control instruction in the application program, which can simplify an operation of the multitasking process, and improve an efficiency and a user interaction experience.

Figure 2:
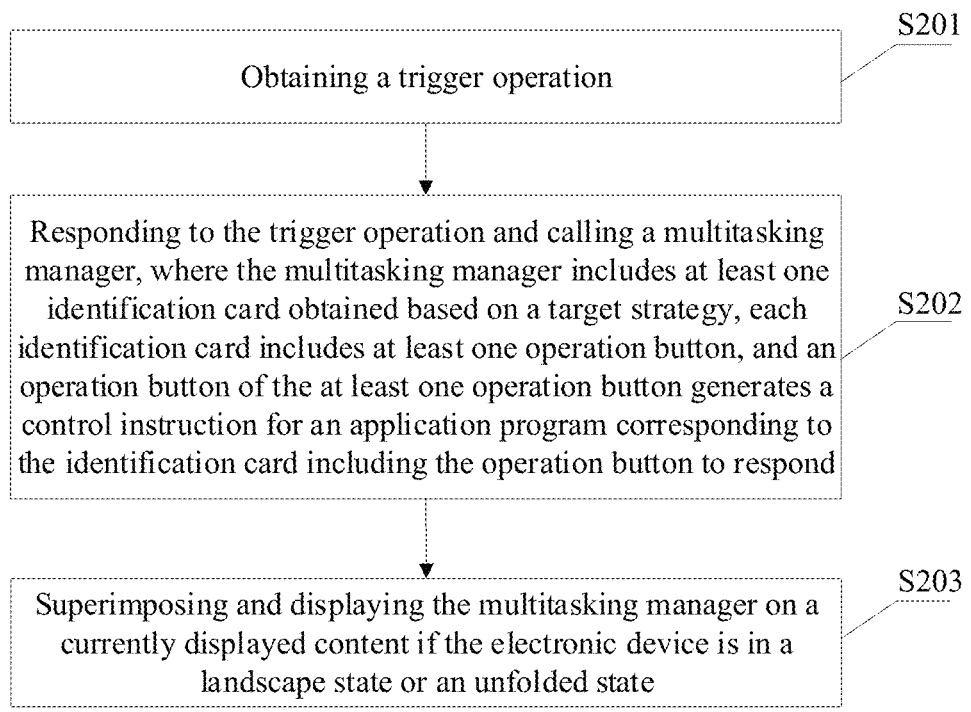
FIG. 2 illustrates a flowchart of another information processing method provided by various embodiments of the present disclosure.

As another optional embodiment of the present disclosure, FIG. 2 illustrates a flowchart of an information processing method provided by various embodiments of the present disclosure. The embodiment is mainly a refinement of the information processing method described in the embodiment shown in FIG. 1. As shown in FIG. 2, the method may include but is not limited to following steps.

In S201: obtaining a trigger operation.

In S202: responding to the trigger operation and calling a multitasking manager, where the multitasking manager includes at least one identification card obtained based on a target strategy, each identification card includes at least one operation button, and an operation button of the at least one operation button generates a control instruction for an application program corresponding to the identification card including the operation button to respond.

For a detailed process of S201-S202, reference may be made to a relevant introduction of S101-S102 in the embodiment shown in FIG. 1, which is not repeated herein.

In S203: superimposingly displaying the multitasking manager on a currently displayed content if the electronic device is in a landscape state or an unfolded state.

After responding to the trigger operation and calling the multitasking manager in the previous step, S203 may determine whether the electronic device is in a landscape state or an expanded state.

Determining whether the electronic device is in a landscape state can includes obtaining change information of a display screen of the electronic device and determining whether the electronic device is in a landscape state according to the change information of the display screen of the electronic device. A landscape state can be understood as a state in which a horizontal display size of the display screen of the electronic device is larger than a vertical display size of the display screen of the electronic device.

When the electronic device includes a folding screen, determining whether the electronic device is in an unfolded state may include obtaining an angle between each two screens of the folding screen collected by a sensor of the electronic device, and determined whether the electronic device is in an unfolded state based on the angle.

When the electronic device includes a curling screen, determining whether the electronic device is in an unfolded state may include obtaining movement information of a telescopic mechanism configured to change a state of the curling screen, determining whether the electronic device is in an unfolded state based on the movement information of the telescopic mechanism.

When the electronic device is in a landscape state or an unfolded state, a display area of the display screen of the electronic device can ensure a display effect when a display requirement for displaying more contents is met, thereby superimposingly displaying the multitasking manager on a currently displayed content.

Steps S201-S203 are introduced in conjunction with an application scenario of video playback by the electronic device. For example, as shown in of FIG. 3(a), when the electronic device plays a video, a user slides up from a bottom of a display screen of the electronic device, the electronic device obtains a gesture of sliding up from the bottom of the display screen of the electronic device and obtain a multitasking manager in response to the trigger operation. As shown in FIG. 3(b), when the electronic device is in a landscape state, the multitasking manager including at least one identification card is superimposedly displayed on a video screen played by the electronic device. FIG. 3(b) simplifies marks of identification cards and operation buttons in a form of a dotted box. In FIG. 3(b), only one of the identification cards and one of the operation buttons are marked. The identification cards in the dotted box in FIG. 3(b) belong to the multitasking manager. The dotted box in FIG. 3(b) is only for marking the identification cards included in the multitasking manager and is not a limitation on a display area of the multitasking manager.

In the embodiment, by obtaining a trigger operation, responding to the trigger operation, and calling a multitasking manager including at least one identification card, and each identification card including at least one operational control, an operation of a multitasking process can be simplified, thereby improving an efficiency and a user interaction experience.

Further, if the electronic device is in a landscape state or an unfolded state, the multitasking manager is superimposedly displayed on a currently displayed content. The multitasking manager is displayed without exiting the currently displayed content, which can improve a display quality of the multitasking manager. In addition, the electronic device is in a landscape state or an unfolded state, which can facilitate operations on the display screen of the electronic device and further improve a user interaction experience.

Figure 4:
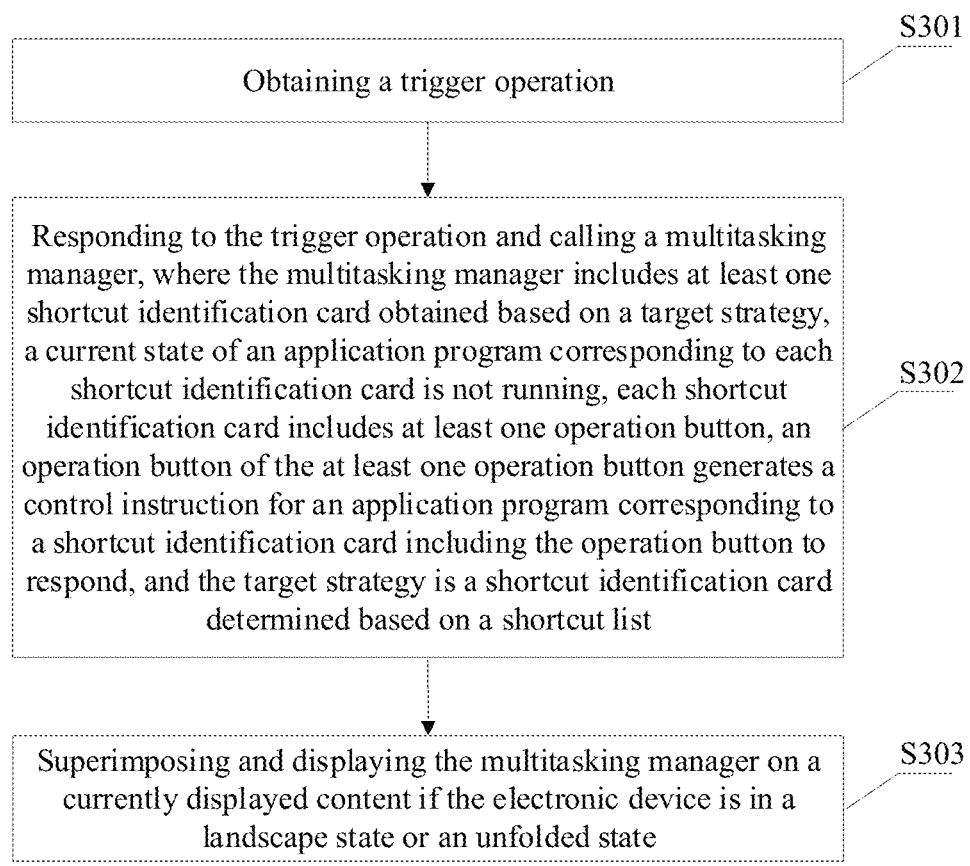
FIG. 4 illustrates a flowchart of another information processing method provided by various embodiments of the present disclosure.

As another optional embodiment of the present disclosure, FIG. 4 illustrates a flowchart of an information processing method provided by various embodiments of the present disclosure. The embodiment is mainly a refinement of the information processing method described in the embodiment shown in FIG. 1. As shown in FIG. 4, the method may include but is not limited to following steps.

In S301: obtaining a trigger operation.

For a detailed process of S301, reference may be made to a related introduction of S101 in the embodiment shown in FIG. 1, which will not be repeated herein.

In S302: responding to the trigger operation and calling a multitasking manager, where the multitasking manager includes at least one shortcut identification card obtained based on a target strategy, a current state of an application program corresponding to each shortcut identification card is not running, each shortcut identification card includes at least one operation button, an operation button of the at least one operation button generates a control instruction for an application program corresponding to a shortcut identification card including the operation button to respond, and the target strategy includes determining a shortcut identification card based on a shortcut list.

In the embodiment, obtaining at least one shortcut identification card based on the target strategy may include obtaining at least one function module of at least one application program, and determining a shortcut identification card of the at least one application program based on at least one function module of the at least one application program.

Determining a shortcut identification card of the at least one application program based on at least one function module of the at least one application program may include following steps.

In S3021: obtaining a shortcut list.

The shortcut list can include shortcut graphic data of at least one function module of the at least one application program, a shortcut function entry of a function module.

The function module can directly access to the at least one application program based on the shortcut function entry of the function module.

In the embodiment, the shortcut list can be acquired from an operating system of the electronic device by a retrieval tool.

The embodiment also provides another way to obtain the shortcut list, which may specifically include following steps.

In S30211: obtaining a target application program in a foreground when an operation is triggered.

The trigger operation in S30211 is a trigger operation for calling the multitasking manager.

In S30212: determining a shortcut list corresponding to the target application based on the target application program.

The shortcut list corresponding to the target application program at least includes the shortcut graphic data of the function module of the target application program and the shortcut function entry of the function module.

Different target application programs correspond to different shortcut lists.

The shortcut list corresponding to the target application program can be configured to determine the shortcut identification card corresponding to the target application program when the target application program is not running again.

In S3022: obtaining from the shortcut list the shortcut graphic data and the shortcut function entry of the function module of the application program.

When a current state of the application program is not running, the shortcut graphic data of the function module of the application program is added to the operation button of the identification card. An association relationship between the operation button and the shortcut function entry of the function module of the application program is established in the identification card to obtain the shortcut identification card.

The current state of the application program may change as the electronic device operates. When the current state of the current program is switched from a non-running state to a running state, the shortcut identification card corresponding to a previously determined application program may no longer be suitable for a control that the application can make in the running state. Therefore, the shortcut identification card corresponding to the previously obtained application program can be deleted from the multitasking manager.

Obtaining from the shortcut list the shortcut graphic data of the function module of the application program and the shortcut function entry of the function module may include obtaining from the shortcut list the shortcut graphic data of the function module of the application program whose usage frequency is higher than a second frequency threshold and the shortcut function entry of the function module.

Optionally, obtaining from the shortcut list the shortcut graphic data of the function module of the application whose usage frequency is higher than a first frequency threshold and the shortcut function entry of the function module may include: obtaining from the shortcut list in at least one function module of the application program whose usage frequency is higher than the second frequency threshold, the shortcut graphic data of the function module of the second target whose usage frequency of the shortcut function is higher than a third frequency threshold, and the shortcut function entry of the function module of the second target.

S302 is a specific implementation of S101 in the embodiment shown in FIG. 1.

In S303: displaying the multitasking manager.

In the embodiment, if the electronic device is in a landscape state or an unfolded state, the multitasking manager may be superimposedly displayed on a currently displayed content.

If the electronic device is in a portrait state or a non-expanded state, the electronic device can switch from the currently displayed content to a specific interface, and only display the multitasking manager on the specific interface.

Figure 5:
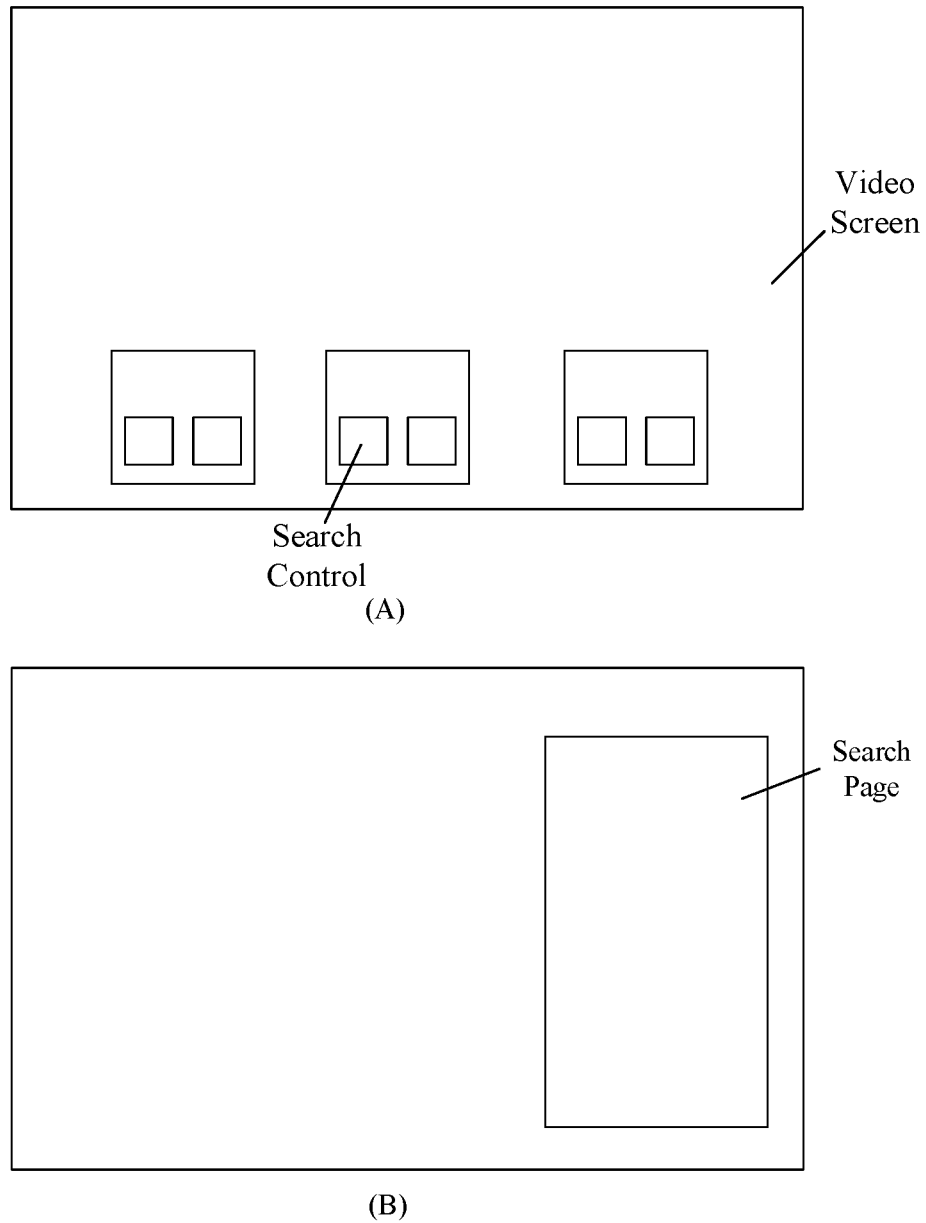
FIG. 5 illustrates another schematic diagram of an implementation scenario of an information processing method consistent with various embodiments of the present disclosure.

When the multitasking manager is displayed, by triggering the operation button in the shortcut identification card, a function module of the application program can be directly entered, and the function module of the application program can respond accordingly. For example, as shown in FIG. 5(a), a search control of a shortcut identification card corresponding to QQ Music can be triggered. When the search control is triggered, a search page of QQ Music can be directly entered. As shown in FIG. 5(b), the search page can be displayed in the electronic device in a form of a floating window.

For a detailed process of S303, reference can be made to a relevant introduction of S103 in the embodiment shown in FIG. 1, which is not repeated herein.

In the embodiment, by obtaining a trigger operation, responding to the trigger operation, calling a multitasking manager including at least one shortcut identification card, a current state of the application corresponding to the shortcut identification card being a non-running state, each identification card including at least one operation button, and displaying the multitasking manager, a function module of an application program can be directly entered by triggering the operation button in the multitasking manager, and the function module of the application program responds, thereby avoiding a plurality of switching, realizing a shortcut control and improving an efficiency and a user interaction experience.

Figure 6:
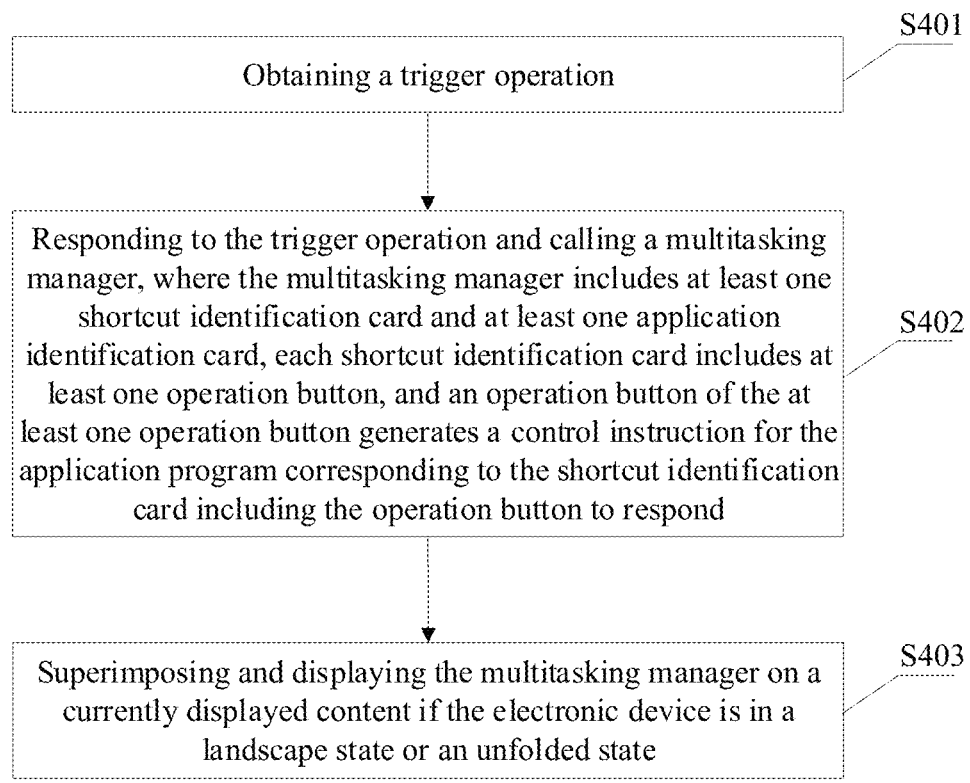
FIG. 6 illustrates a flowchart of another information processing method provided by various embodiments of the present disclosure.

As another optional embodiment of the present disclosure, FIG. 6 illustrates a flowchart of an information processing method provided by various embodiments of the present disclosure. The embodiment is mainly a refinement of the information processing method described in the embodiment shown in FIG. 1. As shown in FIG. 6, the method may include but is not limited to following steps.

In S401: obtaining a trigger operation.

For a detailed process of S401, reference may be made to a relevant introduction of S101 in the embodiment shown in FIG. 1, which is not repeated herein.

In S402: responding to the trigger operation and calling a multitasking manager, where the multitasking manager includes at least one shortcut identification card and at least one application identification card, each shortcut identification card includes at least one operation button, and an operation button of the at least one operation button generates a control instruction for the application program corresponding to the shortcut identification card including the operation button to respond.

When none of the application programs of the electronic device have been activated, the multitasking manager may only include at least one shortcut identification card. A current state of the application program corresponding to each of the at least one shortcut identification card is not running. With an operation of the electronic device, some application programs in the electronic device are activated, some applications have not been activated. Current states of the applications that have not been activated are not running. Therefore, as a state of the application changes, the multitasking manager makes adaptive changes. Specifically, the multitasking manager changes from only including at least one shortcut identification card to including at least one shortcut identification card and at least one application identification card. The application program corresponding to the at least one application identification card is an application program that has been activated.

The application identification card may also include at least one operation button that generates control instructions for an application program corresponding to the application identification card including the operation button to respond.

An operation button included in the shortcut identification card are different from an operation button included in the application identification card.

A target strategy may be a shortcut identification card determined based on a shortcut list and an application identification card determined based on a calling record of the application program.

Specifically, obtaining at least one shortcut identification card and at least one application identification card based on the target strategy may include following steps.

In S4021: obtaining at least one function module of at least one application program and determining a shortcut identification card of at least one application program based on at least one function module of at least one application program.

Figure 3:
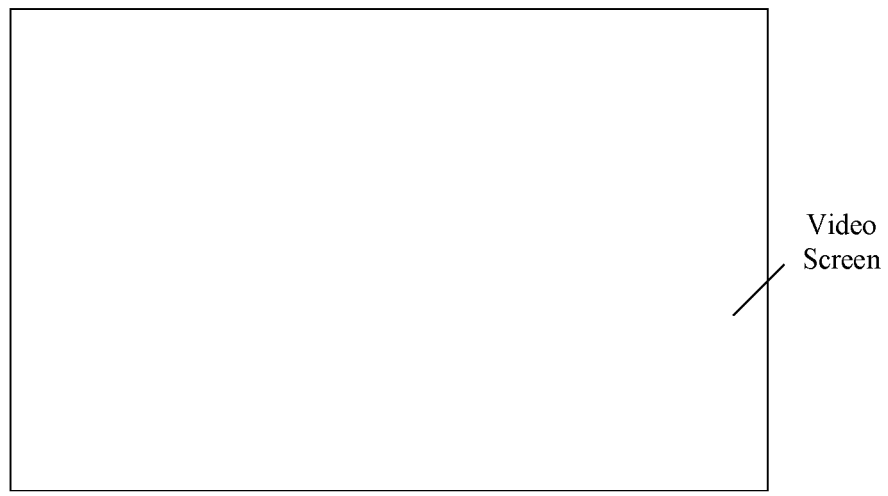
FIG. 3 illustrates a schematic diagram of an implementation scenario of an information processing method consistent with various embodiments of the present disclosure.
Figure 3:
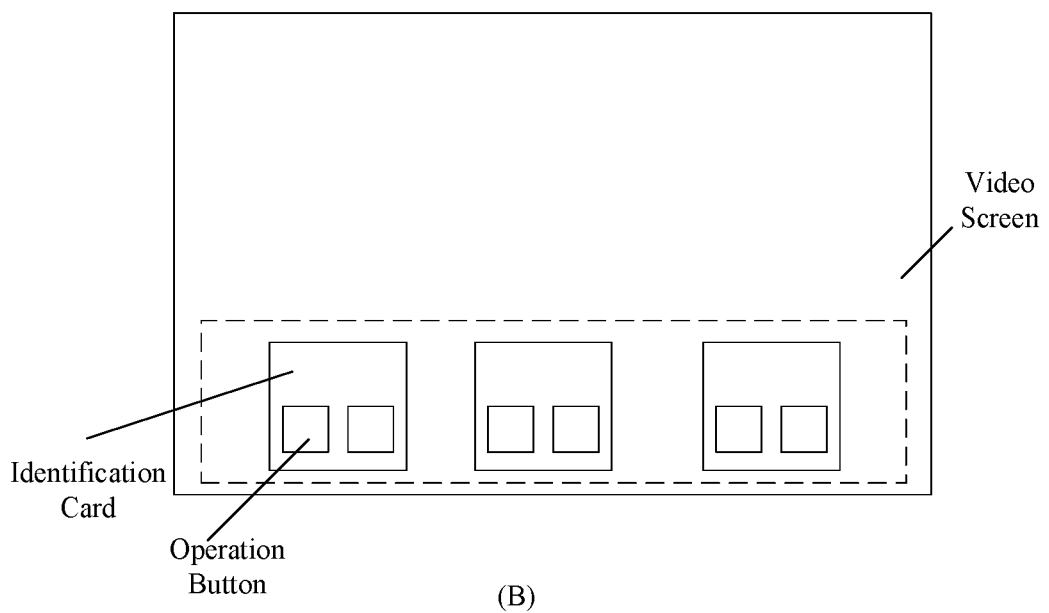

For a detailed process of S4021, reference may be made to a relevant introduction of S302 in the embodiment shown in FIG. 3, which is not repeated herein.

In S4022: obtaining a calling record of the application program.

The calling record of the application program may include a calling record of at least one application program that has been activated.

An application program that has been activated can be understood as an application program that was called and activated before a current moment.

A calling record of the application program that has been activated may include but is not limited to a page content when the application program that has been activated exits from a foreground, and/or a current running state of the application program that has been activated.

A calling record of the application program kept by the electronic device cannot be affected by a current state of the application program that has been activated. For example, as of a current moment, if the application program that has been activated exits a background running, a current state of the application program that has been activated is switched to a non-running state. When the current state of the application program that has been activated is not running, the electronic device can still retain the calling record of the application program that has been activated.

In S4023: obtaining the calling record of the application program that has been activated from the calling record of the application program and adding the calling record of the application program that has been activated to the identification card to obtain the application identification card.

Obtaining the calling record of the application program that has been activated from the calling record of the application program, adding the calling record of the application program that has been activated to the identification card, and obtaining the application identification card may include but not limited to following steps.

In S40231. obtaining the page content when the application program that has been activated exits from the foreground from the calling record of the application and adding the page content when the application program that has been activated exits from the foreground to the identification card to obtain the application identification card.

When the application identification card includes the page content when the application program that has been activated exits from the foreground, if a first trigger operation of the application identification card is obtained, a page content when the application exits from the foreground can be directly rendered in the electronic device.

Obtaining the calling record of the application program that has been activated from the calling record of the application program, adding the calling record of the application program that has been activated to the identification card, and obtaining the application identification card may also include but not limited to following steps.

In S40232: obtaining the page content when the application program that has been activated exits from the foreground from the calling record of the application and adding the page content when the application program that has been activated exits from the foreground to the identification card.

In S40232. obtaining the current running state of the application program that has been activated from the calling record of the application, determining the operation button based on the current running state of the application program that has been activated, adding the operation button to the identification card, and obtaining the application identification card.

Based on the current running state of the application program that has been activated, a determined operation button can represent the current running state of the application program that has been activated.

By default, the operation button of the application identification card in a hidden state. When a second trigger operation (e.g., long-pressing operation on a screen) on the application identification card is obtained, the operation button of the application identification card can be called, and the operation button is rendered in the application identification card.

When the operation button is rendered in the application identification card, a current running state of the application program corresponding to the application identification card can be changed by triggering the operation button.

In S403: displaying the multitasking manager.

Figure 7:
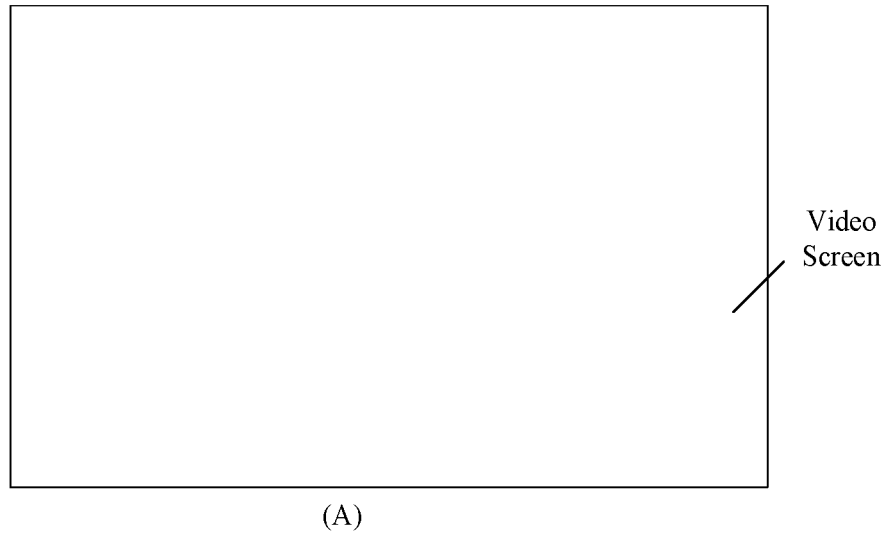
FIG. 7 illustrates another schematic diagram of an implementation scenario of an information processing method consistent with various embodiments of the present disclosure.
Figure 7:
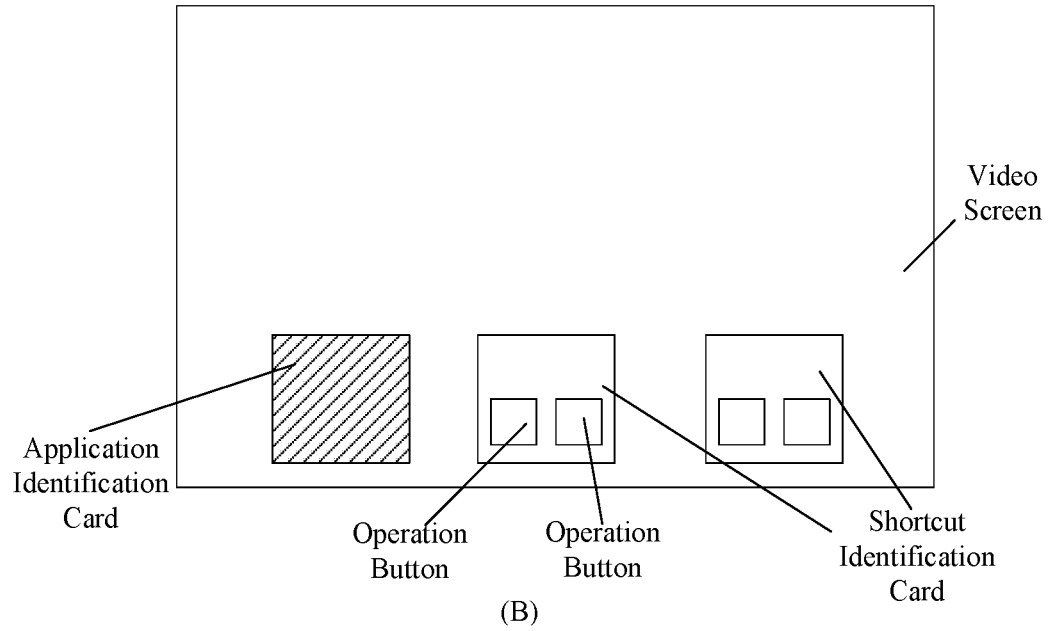

In the embodiment, if the electronic device is in a landscape state or an unfolded state, the multitasking manager may be superimposedly displayed on a currently displayed content. For example, as shown in FIG. 7(a), when the electronic device plays a video, a user swipes up from a bottom of a display screen of the electronic device. The electronic device obtains a gesture of sliding up from the bottom of the display screen of the electronic device, responds to a trigger operation and obtain a multitasking manager. As shown in FIG. 7(b), when the electronic device is in a landscape state, a multitasking manager including a plurality of shortcut identification cards and a plurality of application identification cards is superimposedly displayed on the video screen played by the electronic device.

FIG. 7(b) is a display example of the multi-task manager, which is not a limitation on displaying the multi-task manager.

For at least one application identification card in the multitasking manager, a display order of the at least one application identification card may be determined based on an activation time of the application program corresponding to the application identification card. Based on the display order, the at least one application identification card is displayed.

If the electronic device is in a portrait state or a non-expanded state, the electronic device can switch from a currently displayed content to a specific interface, and only display the multitasking manager on the specific interface.

When the multitasking manager is displayed, if a trigger operation for the operation button in the shortcut identification card is obtained, a function module of the application program can be entered, and the function module of the application program can respond accordingly.

If a first trigger operation on the application identification card is obtained, based on the calling record of the application program that has been activated included in the application identification card, the trigger operation can be responded to. For example, a page content is superimposedly displayed when the application program that has been activated exits from a foreground on a currently displayed content.

Figure 8:
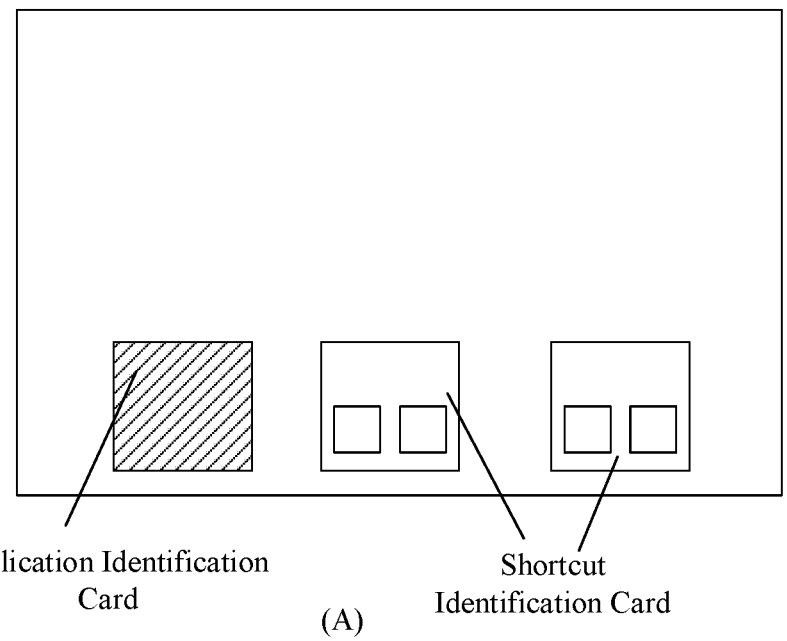
FIG. 8 illustrates another schematic diagram of an implementation scenario of an information processing method consistent with various embodiments of the present disclosure.
Figure 8:
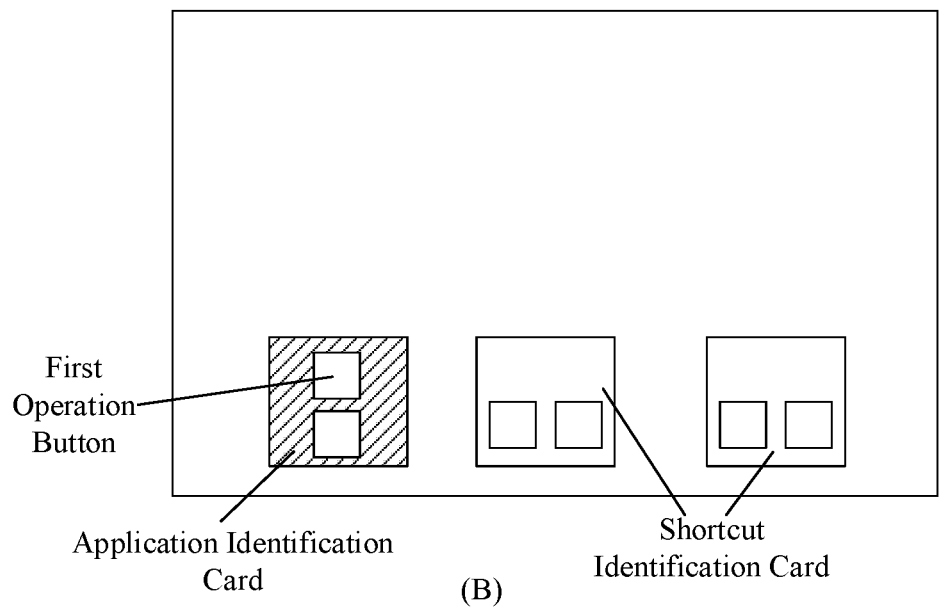

For example, as shown in FIG. 8(a), if a second trigger operation on an application identification card of QQ Music is obtained, an operation button can be rendered in the application identification card of QQ Music. As shown in FIG. 8(b), in QQ Music, there is a first operation button that can indicate that a current running state of QQ Music is a mute state. If the first operation button in FIG. 8(b) is triggered, QQ Music switches the mute state to a non-mute state.

In the embodiment, by obtaining a trigger operation, responding to the trigger operation, calling a multitasking manager including at least one shortcut identification card and at least one application identification card, and displaying the multitasking manager, and by triggering the shortcut identification card or the application identification card in the multitasking manager, an application program corresponding to the shortcut identification card or the application identification card can respond without entering the application program corresponding to the shortcut identification card or the application identification card, and inputting a control instruction in the application program corresponding to the shortcut identification card or the application identification card, which can simplify an operation of a multitasking process, and improve an efficiency and a user interaction experience.

Figure 9:
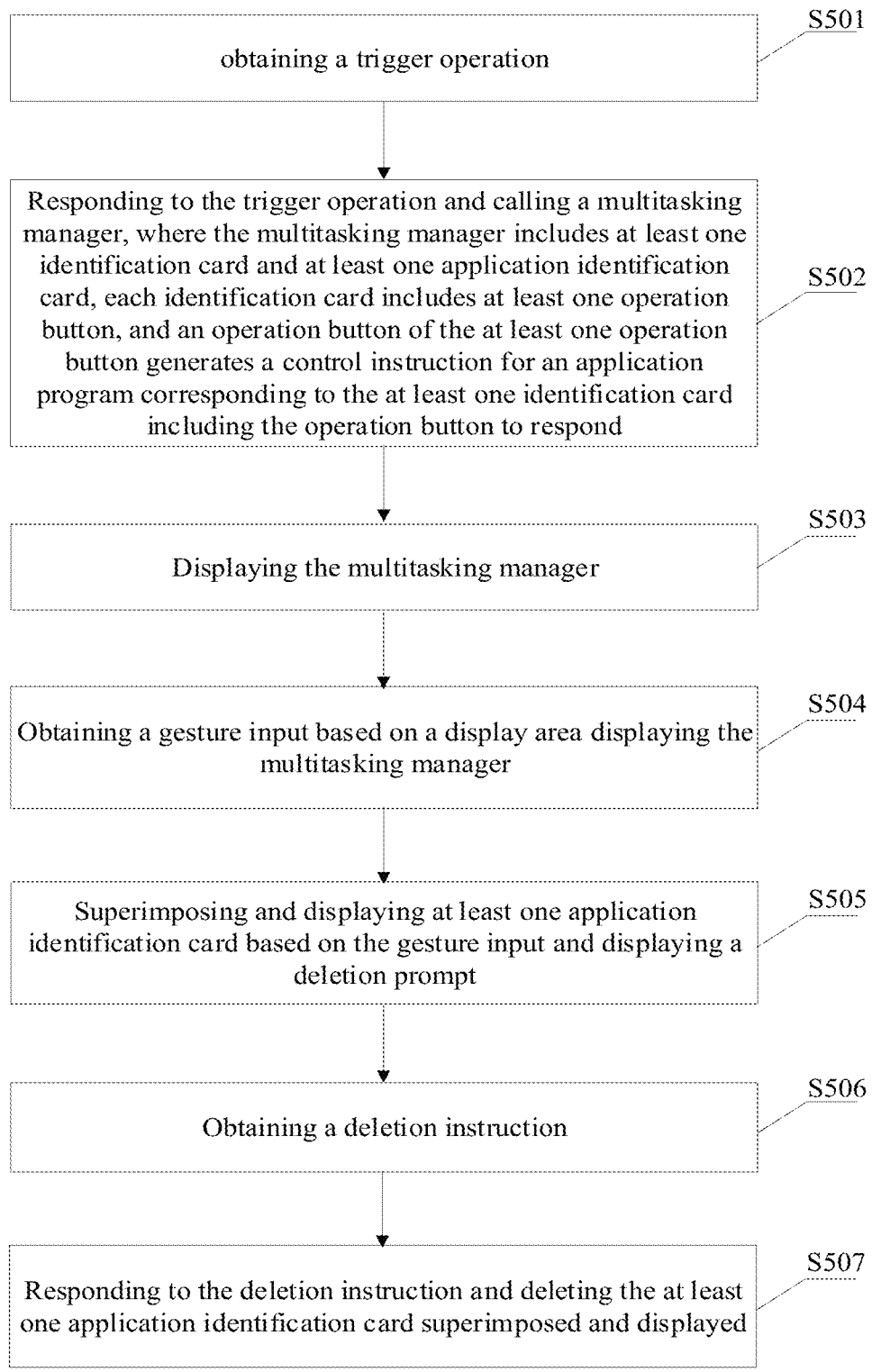
FIG. 9 illustrates a flowchart of an information processing method provided by various embodiments of the present disclosure.

As another optional embodiment of the present disclosure, FIG. 9 illustrates a flowchart of an information processing method provided by various embodiments of the present disclosure. The embodiment is mainly a refinement of the information processing method described in the embodiment shown in FIG. 1. As shown in FIG. 9, the method may include but is not limited to following steps.

In S501: obtaining a trigger operation.

In S502: responding to the trigger operation and calling a multitasking manager, where the multitasking manager includes at least one identification card and at least one application identification card, each identification card includes at least one operation button, and an operation button of the at least one operation button generates a control instruction for an application program corresponding to the identification card including the operation button to respond.

In S503: displaying the multitasking manager.

For a detailed process of S501-S503, reference may be made to a related introduction of S401-S403 in the embodiment shown in FIG. 4, which is not repeated herein.

In S504: obtaining a gesture input based on a display area displaying the multitasking manager.

Figure 10:
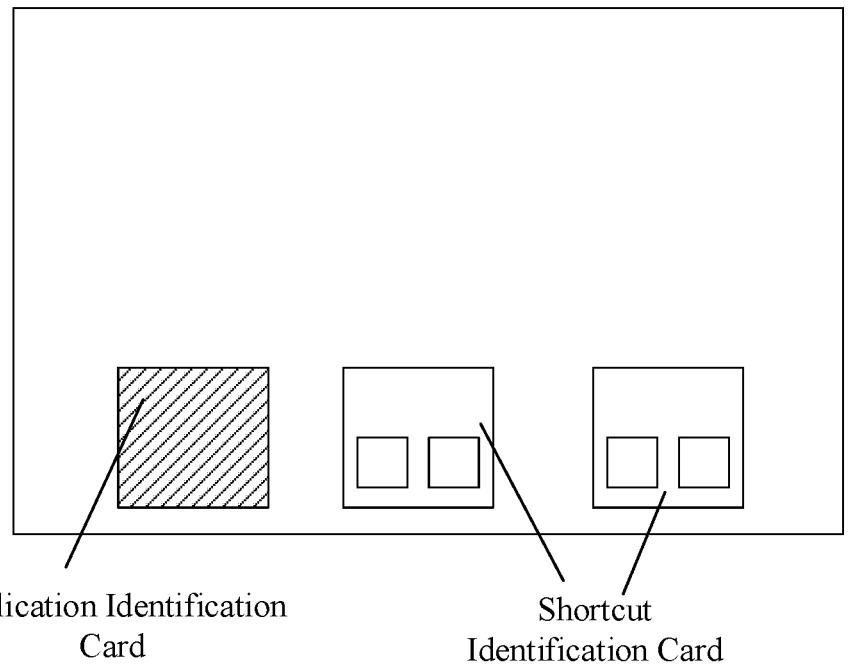
FIG. 10 illustrates another schematic diagram of an implementation scenario of an information processing method consistent with various embodiments of the present disclosure.

In the present disclosure, the gesture input can be set as required, which is not limited herein. The gesture input may include but is not limited to a pinch gesture. As shown in FIG. 10, by inputting a pinch gesture in a display area displaying the multitasking manager, the electronic device can obtain the pinch gesture based on the display area displaying the multitasking manager accordingly.

In S505: superimposingly displaying at least one application identification card based on the gesture input and displaying a deletion prompt.

Figure 11:
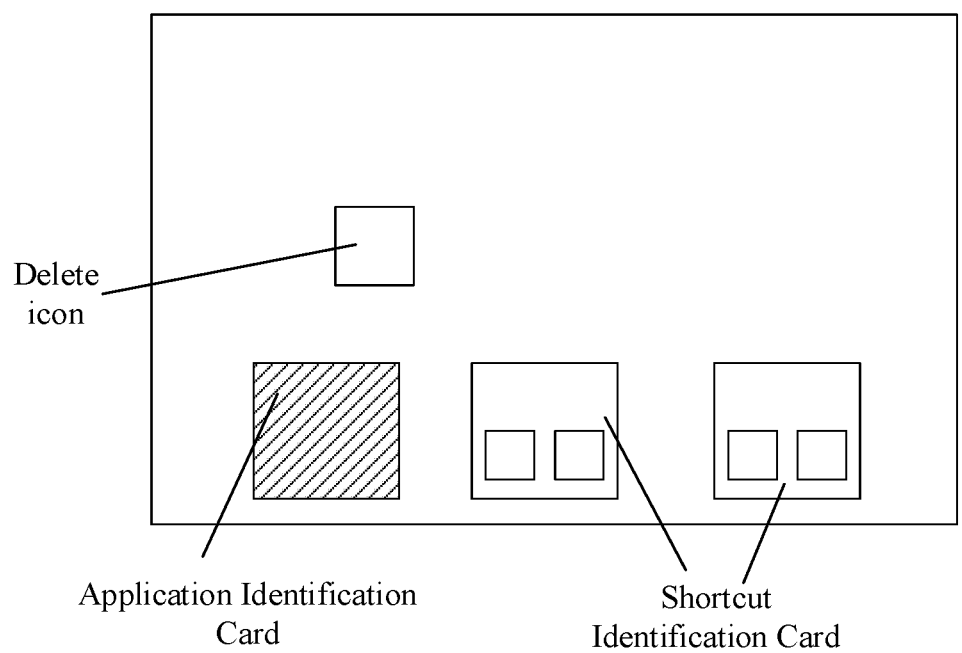
FIG. 11 illustrates another schematic diagram of an implementation scenario of an information processing method consistent with various embodiments of the present disclosure.

In the present disclosure, the deletion prompt can be set as required, which is not limited herein. The deletion prompt may be a deletion icon. As shown in FIG. 11, at least one application identification card is superimposedly displayed, and a delete icon is displayed.

In S506: obtaining a deletion instruction.

In the embodiment, a manner of inputting the deletion instruction includes, but not limited to specifically: dragging the application identification card superimposedly displayed and dragging the application identification card superimposedly displayed to an area of the deletion prompt. Accordingly, if the drag operation on the application identification cards superimposedly displayed is detected, and the application identification card superimposedly displayed is dragged to the area of the deletion prompt, a deletion instruction is obtained.

In S507: responding to the deletion instruction and deleting the at least one application identification card superimposedly displayed.

Figure 12:
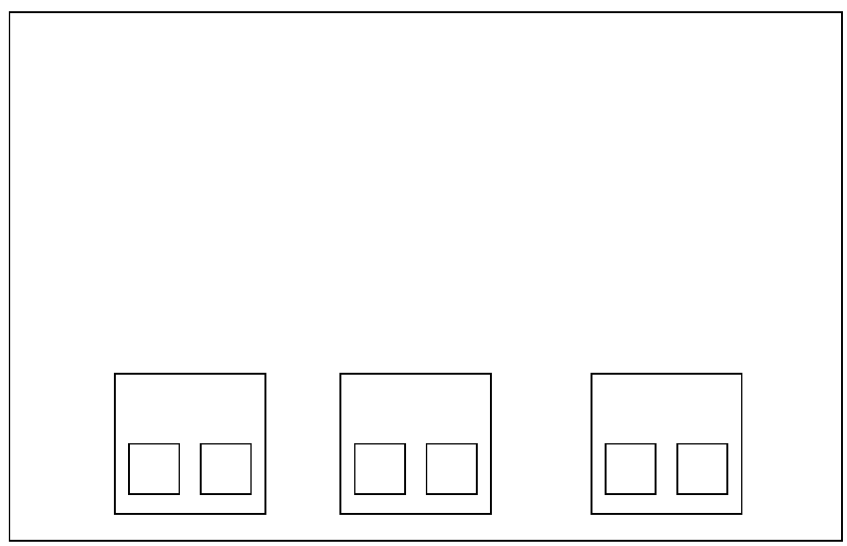
FIG. 12 illustrates another schematic diagram of an implementation scenario of an information processing method consistent with various embodiments of the present disclosure.

The shortcut identification card in the multitasking manager is not affected by the deletion instruction, and the shortcut identification card still exists in the multitasking manager. For example, as shown in FIG. 12, after at least one application identification card superimposedly displayed is deleted, the multitasking manager including only the shortcut identification card is displayed in the electronic device.

In the embodiment, by obtaining a trigger operation, responding to the trigger operation, calling a multitasking manager including at least one identification card and each identification card including at least one operation button, and displaying the multitasking manager, and by triggering the operation button in the multitasking manager, the application program corresponding to the identification card including the operation buttons can respond without entering the application program and inputting the control instruction in the application program, which can simplify an operation of a multitasking process.

In addition, based on the gesture input, at least one application identification card is superimposedly displayed, and a deletion prompt is displayed. A deletion instruction is obtained, and the at least one application identification card superimposedly displayed is deleted in response to the deletion instruction, thereby deleting the at least one application identification card at one time and improving a deletion efficiency without affecting the shortcut identification card in the multitasking manager.

An information processing apparatus will be described below, and the information processing method described above can be referred to each other accordingly.

Figure 13:
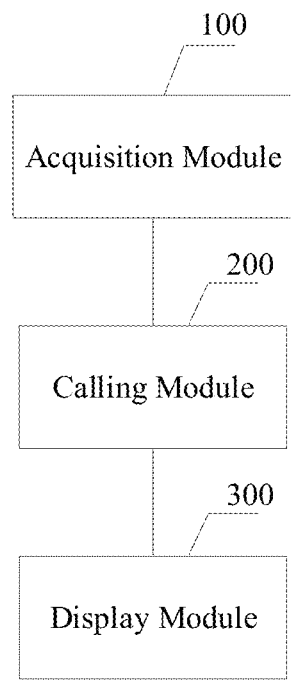
FIG. 13 illustrates a schematic diagram of an information processing apparatus consistent with various embodiments of the present disclosure.

Referring to FIG. 13, the information processing apparatus includes an acquisition module 100 for obtaining a trigger operation, a calling module 200 for responding to the triggering operation and calling a multitasking manager and a display module 300 for displaying the multitasking manager. The multitasking manager includes at least one identification card obtained based on a target strategy. Each identification card includes at least one operation button. An operation button of the at least one operation button generates a control instruction for an application program corresponding to the at least one identification card including the operation button to respond.

In the embodiment, the display module 300 can be specifically configured for superimposingly displaying the multitasking manager on a currently displayed content if the electronic device is in a landscape state or an unfolded state.

In the embodiment, obtaining the at least one identification card based on the target strategy may include obtaining at least one shortcut identification card. A current state of the application program corresponding to each of the at least one shortcut identification card is not running. The application program corresponding to at least one application identification card is an application program that has been activated. The target strategy includes determining a shortcut identification card based on a shortcut list and determining an application identification card based on a calling record of the application program.

In the embodiment, the shortcut list can be obtained by obtaining a target application program in a foreground when an operation is triggered and determining the shortcut list corresponding to the target application program based on the target application program. Shortcut lists corresponding to different target application programs are different.

In the embodiment, the operation button included in the shortcut identification card may be determined based on a function module of the application program corresponding to the shortcut identification card.

The operation button included in the application identification card can be determined based on the current running state of the application program corresponding to the application identification card.

The operation button included in the shortcut identification card are different from the operation button included in the application identification card.

In the embodiment, the information processing apparatus may also include a deletion module for obtaining a gesture input based on a display area displaying the multitasking manager, superimposingly displaying at least one application identification card based on the gesture input and displaying a deletion prompt, obtaining a delete instruction and responding to a delete instruction to delete the at least one application identification card superimposedly displayed.

Corresponding to the above embodiments of an information processing method provided by the present disclosure, the present disclosure also provides an electronic device embodiment applying the information processing method.

Figure 14:
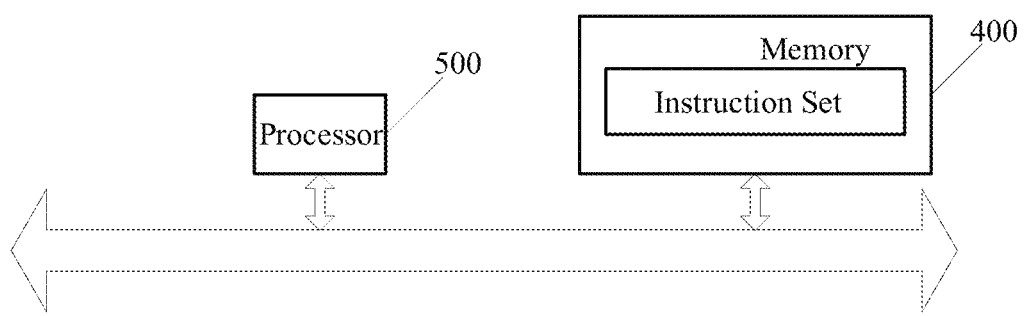
FIG. 14 illustrates a schematic diagram of an electronic device consistent with various embodiments of the present disclosure.

FIG. 14 illustrates a schematic diagram of an electronic device consistent with various embodiments of the present disclosure. The electronic device may include a memory 400 and a processor 500. The memory 400 is configured for storing at least one set of instructions and the processor 500 is configured for calling and executing at least one instruction set in the memory 400 and executing the information processing method described in any one of the above embodiments by executing the at least one instruction set.

Corresponding to the above embodiments of an information processing method provided by the present disclosure, the present disclosure further provides a storage medium embodiment.

In the embodiment, the storage medium stores a computer program for implementing the information processing method described in any of the above embodiments, The computer program is executed by a processor to realize the information processing method described in any of the above embodiments.

It should be noted that each embodiment focuses on differences from other embodiments. Same and similar parts between the various embodiments may be referred to each other.

Since a device embodiment basically is like a method embodiment, a description of the device embodiment is relatively simple. For relevant parts, references can be made to a corresponding description of the method embodiment.

Finally, it should be noted that in the present specification, relationship terms such as first and second are only used to distinguish one entity or operation from another entity or operation, and do not necessarily require or imply that there is any such actual relationship or order between these entities or operations. Furthermore, terms "include", "comprise" or any other variants thereof are intended to cover non-exclusive inclusions, so that a process, method, article or terminal device that includes a list of elements is not only limited to those elements, but may include other elements not explicitly listed, or inherent to the process, method, article, or terminal device. Without more restrictions, an element defined by a sentence "includes a . . . " does not exclude an existence of other identical elements in a process, method, article, or terminal device that includes the element.

For the sake of convenience, when describing the above devices, the descriptions are made by different modules according to functions thereof. Of course, when implementing the present disclosure, functions of each module may be implemented in one or more software and/or hardware.

Through the description of the above embodiments, a person skilled in the art can clearly understand that the present disclosure can be implemented by means of software plus a necessary general hardware platform. Based on the above understanding, the technical solution of the present disclosure, which is essential or contributes to the related art, may be embodied in the form of a software product stored in a storage medium such as ROM/RAM, disk, the optical disc, including a number of instructions for causing a terminal device (which may be a cell phone, a computer, a server, or a network device, etc.) to perform the methods described in various embodiments or parts of embodiments of the present disclosure.

As disclosed in the present disclosure, by obtaining a trigger operation, responding to the trigger operation, calling a multitasking manager including at least one identification card based on a target strategy, each identification card including at least one operation button and display the multitasking manager, and by triggering the operation button in the multitasking manager, an application program corresponding to the identification card including the operation buttons can respond without entering the application program and inputting the control instructions in the application program, which can simplify an operation of a multitasking process, and improve a user interaction experience.

A method, a device, an electronic device, and a storage medium provided by the present disclosure are described in detail above. In the present specification, specific examples are used to illustrate principles and implementation manners of the present disclosure. The description of the above embodiments is only used to help understand methods and core ideas of the present disclosure. At a same time, for a person skilled in the art, according to ideas of the present disclosure, there will be changes in a specific implementation manner and a specific application scope. In summary, the content of the present specification should not be construed as a limitation of the present disclosure.

What is claimed is:

1. An information processing method, comprising:
obtaining a trigger operation;
responding to the trigger operation by calling a multitasking management interface; and
displaying the multitasking management interface, comprising simultaneously displaying a shortcut identification card and an application identification card that are visually different from each other while displayed within the multitasking management interface, the shortcut identification card and the application identification card being obtained based on a target strategy;
wherein the target strategy for obtaining the shortcut identification card and the application identification card includes:
determining the shortcut identification card based on a shortcut list obtained from an operating system associated with the multitasking management interface a current state of an application program corresponding to the shortcut identification card being a non-running state;
determining the application identification card based on a calling record of an other application program corresponding to the application identification card, the other application program corresponding to the application identification card being activated, wherein the application identification card includes at least one first operation button, the at least one first operation button is in a hidden state by default and the at least one first operation button is triggerable to a visible state, and the at least one first operation button is configured to generate a first control instruction of a first corresponding function module of the other application program.

2. The method according to claim 1, wherein the displaying of the multitasking management interface comprises:
displaying the multitasking management interface superimposed on a currently displayed content in response to an electronic device being in a landscape state or an unfolded state.

3. The method according to claim 1, wherein the shortcut list is obtained by:
obtaining a target application program running in a foreground when an operation is triggered; and
determining a shortcut list corresponding to the target application program based on the target application program, wherein shortcut lists corresponding to different target application programs are different.

4. The method according to claim 3, further comprising:
obtaining a gesture input based on a display area displaying the multitasking management interface;
displaying the application identification card superimposed on a currently displayed content and displaying a deletion prompt based on the gesture input;
obtaining a delete instruction; and
responding to the delete instruction for deleting the application identification card.

5. The method according to claim 1, wherein:
the shortcut identification card includes a plurality of second operation buttons, and each of the plurality of second operation buttons is configured to generate a second control instruction to enter a second corresponding function module of the application program corresponding to the shortcut identification card;
the plurality of second operation buttons included in the shortcut identification card are determined based on different function modules of the application program corresponding to the shortcut identification card.

6. The method according to claim 5, wherein the different function modules include a search module.

7. The method according to claim 1, wherein the target strategy for obtaining the shortcut identification card and the application identification card further includes:
in response to the current state of the application program corresponding to the shortcut identification card being switched from the non-running state to a running state, deleting the shortcut identification card corresponding to the application program from the multitasking management interface.

8. The method according to claim 1, wherein the multitasking management interface is displayed depending upon a state of an electronic device:
in a portrait state or a non-expanded state, the electronic device switches from a currently displayed content to a specific interface, and display the multitasking management interface on the specific interface; and in a landscape state or an unfolded state, the electronic device displays the multitasking management interface by superimposing the multitasking management interface on the currently displayed content.

9. The method according to claim 1, wherein the shortcut identification card is displayed using an icon of the application program corresponding to the shortcut identification, and the application identification card is displayed using a page content when the other application program corresponding to the application identification card exits from a foreground.

10. An electronic device, comprising:
a memory containing at least one set of instructions; and
a processor coupled to the memory and, when an instruction set of the at least one set of instructions being executed, configured to:
obtain a trigger operation;
respond to the triggering operation by calling a multitasking management interface; and
display the multitasking management interface, comprising simultaneously displaying a shortcut identification card and an application identification card that are visually different from each other while displayed within the multitasking management interface, the shortcut identification card and the application identification card being obtained based on a target strategy;
wherein the target strategy for obtaining the shortcut identification card and the application identification card includes:
determining the shortcut identification card based on a shortcut list obtained from an operating system associated with the multitasking management interface, a current state of an application program corresponding to the shortcut identification card being a non-running state;
determining the application identification card based on a calling record of an other application program corresponding to the application identification card, the other application program corresponding to the application identification card being activated, wherein the application identification card includes at least one first operation button, the at least one first operation button is in a hidden state by default and the at least one first operation button is triggerable to a visible state, and the at least one first operation button is configured to generate a first control instruction of a first corresponding function module of the other application program.

11. The device according to claim 10, wherein the processor is further configured to:
display the multitasking management interface superimposed on a currently displayed content in response to an electronic device being in a landscape state or an unfolded state.

12. The device according to claim 10, wherein to obtain the shortcut list, the processor is further configured to:
obtain a target application program running in a foreground when an operation is triggered; and
determine a shortcut list corresponding to the target application program based on the target application program, wherein shortcut lists corresponding to different target application programs are different.

13. The device according to claim 12, wherein the processor is further configured to:
obtain a gesture input based on a display area displaying the multitasking management interface;
display the application identification card superimposed on a currently displayed content and display a deletion prompt based on the gesture input;
obtain a delete instruction; and
respond to the delete instruction for deleting the application identification card.

14. A non-transitory computer-readable storage medium storing a computer program for, when being executed by a processor, performing an information processing method, the method comprising:

obtaining a trigger operation;

responding to the trigger operation by calling a multitasking management interface; and displaying the multitasking management interface, comprising simultaneously displaying a shortcut identification card and an application identification card that are visually different from each other while displayed within the multitasking management interface, the shortcut identification card and the application identification card being obtained based on a target strategy;

wherein the target strategy for obtaining the shortcut identification card and the application identification card includes:

determining the shortcut identification card based on a shortcut list obtained from an operating system associated with the multitasking management interface of the electronic device a current state of an application program corresponding to the shortcut identification card being a non-running state;

determining the application identification card based on a calling record of an other application program corresponding to the application identification card, the other application program corresponding to the application identification card being activated, wherein the application identification card includes at least one first operation button, the at least one first operation button is in a hidden state by default and the at least one first operation button is triggerable to a visible state, and the at least one first operation button is configured to generate a first control instruction of a first corresponding function module of the other application program.

* * * * *